UNITED STATES PATENT OFFICE.

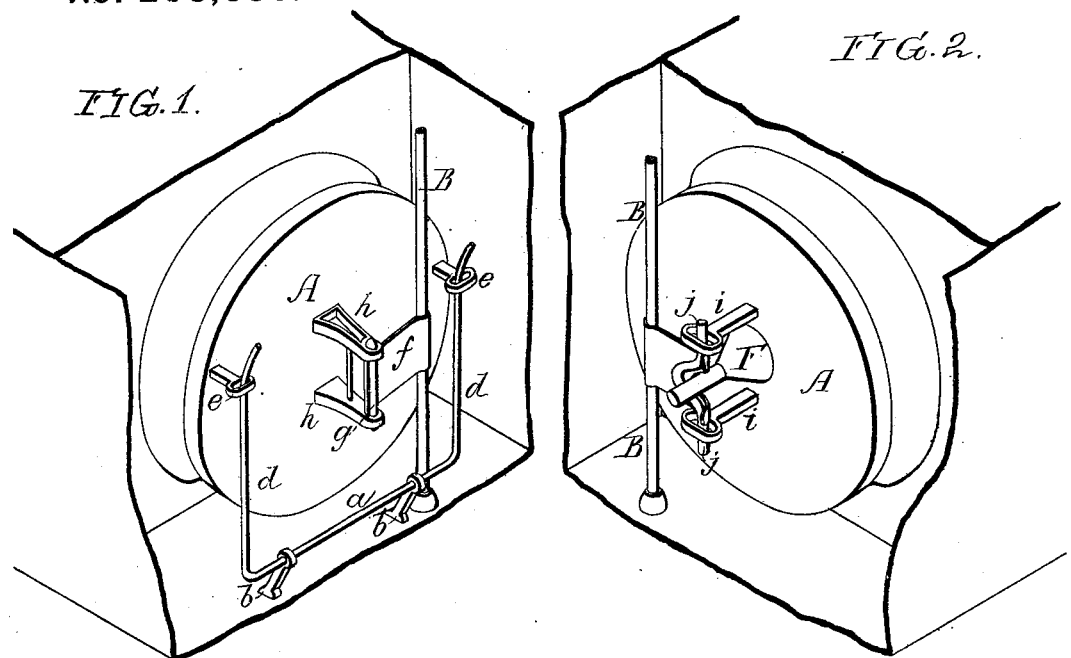

ADOLPH LEVY, OF PHILADELPHIA, PENNSYLVANIA.

IMPROVEMENT IN GAS-METERS.

Specification forming part of Letters Patent No. 208,686, dated October 8, 1878; application filed March 7, 1878.

*To all whom it may concern:*

Be it known that I, ADOLPH LEVY, of Philadelphia, Pennsylvania, have invented a new and useful Improvement in Gas-Meters, of which the following is a specification:

My invention relates to certain improvements in guides for the bellows of a gas-meter, and to devices by which the movements of the bellows are imparted to the rock-shafts which operate the registering devices, the object of my improvements being to steady the movement of the bellows and to facilitate the operation of the rock-shafts. These objects I attain in the manner which I will now proceed to describe, reference being had to the accompanying drawing, in which—

Figure 1 is a perspective view of sufficient of a gas-meter to show the old method of guiding the bellows-head and imparting the movement of the same to the rock-shaft; Fig. 2, a view of the same character, but illustrating my improvements; and Fig. 3, a sectional view of the body of a meter provided with my improvements.

It should be understood in the outset that the drawing illustrates merely that portion of the meter in which the bellows work, the gas-passages, registering devices, valves, &c., with which meters are provided not being shown, as they are not necessary to an understanding of my invention.

The usual plan of guiding the movable bellows-head A, as shown in Fig. 1, is by means of a bar or shaft, $a$, adapted to bearings in lugs $b$ on the bottom of the meter, and having arms $d$, which are adapted to slotted lugs $e$ on the bellows-head. This plan is objectionable, because it is insecure and does not guide the bellows-head as accurately as is desired.

B is the vertical spindle, which is connected at its upper end to the registering and valve-operating devices of the meter. Ordinarily, this spindle is connected by means of a sheet-metal plate, $f$, to a rock-shaft, $g$, adapted to bearings in standards $h$, projecting from the bellows-head A. The objection to this plan is that the shaft $g$ and plate $f$ are liable to bind and prevent the free and unobstructed movement of the bellows-head.

In carrying out my invention I provide the central partition, D, of the meter with a transverse rod, E, which projects on each side of the partition, as shown in Fig. 3. In the movable head A of each bellows J is formed a central tubular projection, F, closed at the outer end, the projection of one bellows-head being adapted to one end of the rod E and the projection of the other bellows-head to the opposite end of said rod. By this means the bellows-heads are accurately guided in their movement, and vibrations of the head are prevented.

Instead of the usual standards on the bellows-head, I provide the same with lugs $i$, having slotted ends, to which are adapted projecting pins $j$ on the sheet-metal plate $f$, these pins taking the place of the usual rock-shaft $g$, and permitting a much easier movement of the bellows-head.

I claim as my invention—

1. The combination of the transverse rod E with a bellows having a head with a tubular projection, F, as specified.

2. The combination of the bellows-head A and its slotted lugs $i$ with the shaft B and its plate $f$, having pins $j$, as set forth.

In testimony whereof I have signed my name to this specification in the presence of two subscribing witnesses.

A. LEVY.

Witnesses:
HARRY A. CRAWFORD,
HARRY SMITH.